Nov. 17, 1964 V. F. ZAHODIAKIN 3,157,215

QUICK-LOCKING FASTENER WITH PREVAILING TORQUE

Filed Jan. 10, 1961 2 Sheets-Sheet 1

INVENTOR.
VICTOR F. ZAHODIAKIN
BY
Howard P. King
ATTORNEY

Nov. 17, 1964     V. F. ZAHODIAKIN     3,157,215
QUICK-LOCKING FASTENER WITH PREVAILING TORQUE
Filed Jan. 10, 1961     2 Sheets-Sheet 2
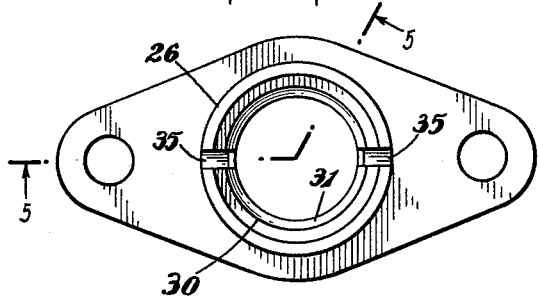
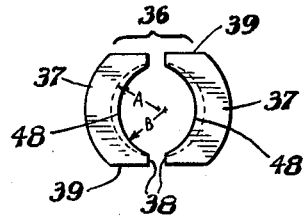
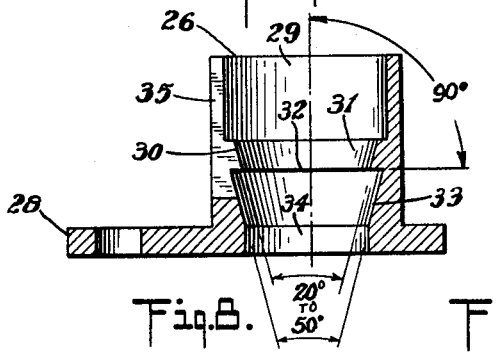
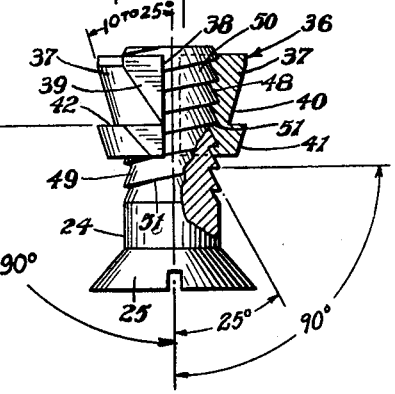
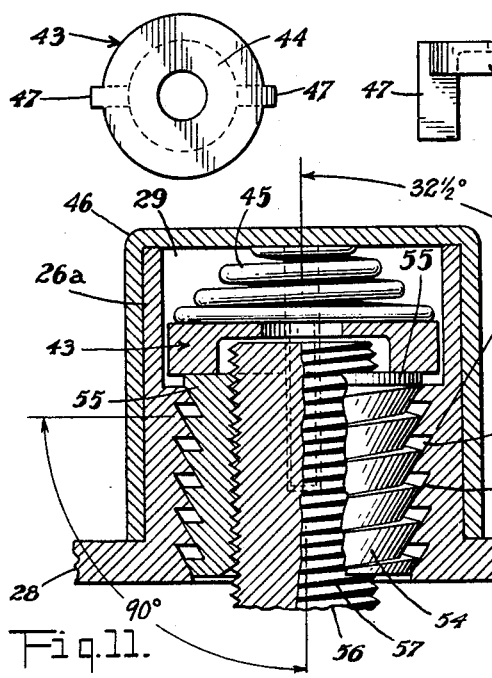
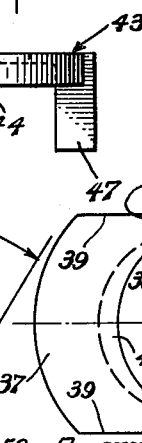
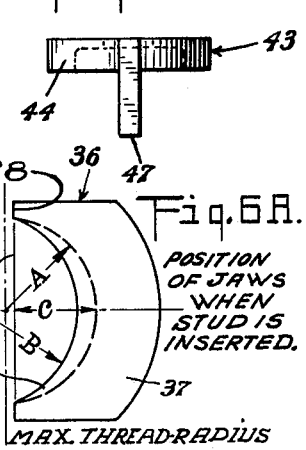
INVENTOR.
VICTOR F. ZAHODIAKIN
BY
Howard P. King
ATTORNEY

United States Patent Office 3,157,215
Patented Nov. 17, 1964

3,157,215
QUICK-LOCKING FASTENER WITH
PREVAILING TORQUE
Victor F. Zahodiakin, P.O. Box 689, Summit, N.J.
Filed Jan. 10, 1961, Ser. No. 81,737
2 Claims. (Cl. 151—19)

This application is a continuation-in-part of Ser. No. 709,984, now abandoned, filed January 20, 1958, and relates to fastening devices such as adapted for use in fastening together superposed panels or other members of assemblies. Quickly operable devices of this general character have extensive use in industry, as for use with aircraft as well as a variety of other applications, for securing in place various members, such as plates, brackets, doors and panels, among numerous other parts and things. The invention has particular reference to fastening devices of the so-called rotary type, that is, of a type adapted to be secured in place by relative rotation between coacting parts.

In its general aspect, the invention contemplates an improved fastening device of quick-locking rotary type which will lock tightly in place and remain securely in place under all conditions of use.

A more specific object of the invention is to provide a rotary type fastening device in which longitudinal displacement between a pair of half sleeves or jaws within a receptacle is obtained by means of a threaded bolt or stud engaging within said jaws and generating a great radial force between the jaws and receptacle which is transmitted to the bolt or stud and thereby providing locking engagement.

Another object of the invention is to provide a rotary type quick locking fastening device of the character above indicated with half sleeves or jaws and wherein such jaws tend to contract toward each other to generate a constant prevailing torque on the threaded stud and thereby prevent the stud from disengaging from the device regardless of adverse conditions, such as when the stud is not fully screwed home.

It is another object of the invention to provide a rotary type fastening device which has a tubular receptacle the bore of which is provided with a plurality of divergent or frusto-conical cutouts and the external surfaces of the half sleeves or jaws correspondingly provided with divergent or frusto-conical projections for cooperation with the receptacle, and wherein the jaws are constantly urged diametrically toward each other to generate torque.

Also specifically, another object of the invention is to provide inter-engaging working facets of conical type on the exterior of the half sleeves or jaws and in the receptacle cutouts by which a radial gripping force is generated initially by an axially positioned coil spring and later a maximum axial force is generated by operation of screwing the stud home, and to thereby also simultaneously generate a maximum radial gripping force on the stud.

A further object of the invention is to construct the half sleeves or jaws so that upon assembly as a complete sleeve a plurality of circumferential edges are provided of maximum diameter and the said maximum diameter is the same for all of said edges.

Another object of the invention is to shape the internal minor diameter crests of the threads of the half sleeves or jaws in such a way that the jaws at their facing edges will not damage the stud, regardless of the hardness of the jaws, when the stud threads are slid across said threads of the jaws in the manner of a ratchet.

In greater detail, the invention proposes a quick acting stud and sleeve or nut assembly of fastening device employing a threaded stud and nut, comprising a tubular shell or receptacle containing a pair of half sleeves or jaws, the interior of the receptacle being provided with a plurality of cutouts of generally frusto-conical and coaxial character around the bore which engage corresponding projections of generally frusto-conical character positioned on the exterior of the jaws, said jaws being interiorly threaded for engagement with the stud, and wherein spring means is provided for acting axially to force the jaws to a minimum effective pitch diameter and thereby provide prevailing torque when the stud is engaged in the interior of the jaws.

Yet another object of the invention is to provide a fastening device which generates the prevailing torque on the stud by means of a spring and yet in case of failure of the spring effectiveness of the device will not be depreciated in its positive locking ability when the stud is screwed home, nor wherein normal operation of the device will be impaired with exception that prevailing torque will not be effective.

Another and important object of the invention is to provide a stud and socket fastening device in which engagement of the stud with its nut composed of half sleeves or jaws, is accomplished not only by screwing the stud into the nut but may be accomplished by simply pressing on the head of the stud in axial direction to cause the stud threads to slide over the threads of the jaws in the nature of a ratchet and then by twisting the stud clockwise positively locking the entire assembly.

A still further object of the invention is to provide a locking device which, even though subjected to extremely high temperature sufficient to destroy the resiliency of its spring will continue unimpaired in maintaining its positive locking force on the stud by virtue of positive locking of the stud being effected by radial forces generated by axial force applied by screw operation of the stud.

Other objects, advantages and novel features of construction will become apparent to persons skilled in the art to which the invention appertains as the description proceeds, both by direct recitation thereof and by implication from the context.

Referring to the accompanying drawings, in which like numerals of reference indicate similar parts throughout the several views:

FIGURE 4 is a plan of the receptacle constituting the fixed part of the fastening device when used;

FIGURE 5 is a sectional view on line 5—5 of FIG. 4;

FIGURE 6 is a plan of the two half sleeves or jaws which cooperate to constitute a gripping sleeve for the device;

FIGURE 6A is a view similar to FIG. 6, but on an increased scale, and showing the radius of the peaks of the jaw threads greater than the radius of the valleys thereof;

FIGURE 7 is an elevation, partially in section, of said gripping sleeve or jaws with the stud inserted therein;

FIGURE 8 is a plan of a key-ring employed in the device;

FIGURE 9 is an edge elevation of said key-ring looking at what may be called, for convenience, the front edge of said key-ring;

FIGURE 10 is a side elevation of said key-ring; and

FIGURE 11 is a vertical sectional view of a modified construction of fastening device embodying the invention.

Figure 1:
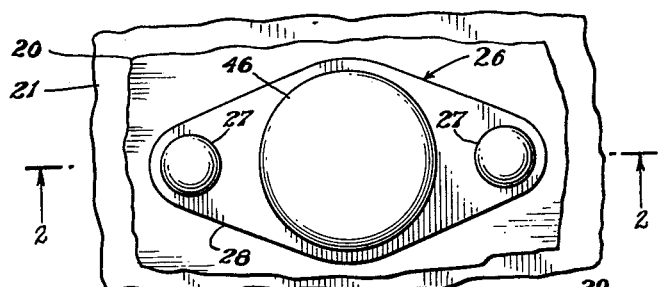
FIGURE 1 is a plane of the fastening device of the present invention showing the same in position on members being clamped thereby.

There have been many attempts to create fastening devices of the above mentioned rotary type, but such attempts have involved numerous difficulties. For example, some of such devices involve the use of intricate parts which easily become ineffective in operation or cannot withstand elevated temperatures. Another difficulty with such devices as generally available heretofore resides in the fact that they are made to accommodate substantially only one thickness of members to be fastened together and if such thicknesses vary beyond reasonable tolerances then complementary parts of different size have to be used, as a result of which a large stock of parts of different size have to be maintained on hand in the field. Further difficulty inherent with prior art devices of this nature is that they are excessively limited, as compared with their size, in their load-carrying ability, both in respect to shear and tensile loads. Another difficulty in present-day devices is that they must be invariably reset during engaging operations if tolerances vary even to a microscopic dimension, since in such locking operation the panels have to be brought tightly together, but when the device is open the panels frequently assume nonparallel relation and necessitate readjustment of the present day fastener to a greater spread to accommodate it to the deviation of the panels for obtaining initial bite of the fastener and then require re-tightening of the fastener to effect the final clamping of the members, which involves great difficulties and loss of time.

Furthermore, such devices as heretofore available allow separation of the parts fastened together due to the fact that the stud thereof cannot be retained in the nut with sufficient radial grip and slight twist of panels or parts causes the stud to move and separate the panels and as a result relative vibration of the parts occurs which finally causes damage to the device or breakage due to crystallization of the metal and consequent disengagement of the fastened panels, which would terminate in tragic results if such device would be used and thus fail on an aircraft.

By utilization of the present invention, the above mentioned and other difficulties are effectively overcome. In general terms, the structure here disclosed comprises in combination with a threaded stud, a hollow receptacle the bore of which is provided with coaxial cutouts of generally frusto-conical shape. The receptacle is secured to one of the panels or other member to be fastened in place, said receptacle containing a sleeve composed of a pair of internally threaded half sleeves or jaws which are initially contracted by a coil spring to a smaller effective pitch diameter than the stud to generate prevailing torque with the stud inserted in the sleeve. These jaws composing the sleeve have exterior coaxial surfaces of generally frusto-conical type to engage the frusto-conical cutouts in the bore of the receptacle, and said jaws also have in the preferred construction specially formed internal threads adapted to engage similar specially formed external threads of the stud. Such a stud is adapted to be introduced through prepared openings in the two or more panels or members to be fastened together, and the stud has a head or the like adapted to engage what will be herein termed arbitrarily the outer one of said members. The special threads on the stud have greater pitch diameters compared to the effective pitch diameters of the internal threads of the pair of half sleeves or jaws when those jaws are slid downwardly under axial force of the said coil spring, so that when the stud is introduced or screwed into the sleeve it will meet with uniform resistance against turning which is herein referred to as prevailing torque.

Introduction of the stud into said sleeve is facilitated by provision of a plurality of cutouts of generally frusto-conical form in the bore of the receptacle, the external surface of the sleeve having the same number of cooperating projections which correspond to the internal cutouts of the receptacle, and the internal special threads of the jaws correspond substantially to the special threads of stud. By constructing the jaws and their threads to function in the nature of ratchets with the stud threads, normal screwing of the stud into proximate final position is no longer necessary; the stud will be initially introduced in the jaws which prior to such introduction are of smaller effective pitch diameter, by simple pressure on the stud head which causes the contracted jaws to move axially upwardly and radially outwardly thereby compressing the coil spring. Such movement of the jaws provides space for entry of the stud until the panels come into close proximity one to another, and then by twisting the stud clockwise the sleeve moves axially slightly downwardly, bringing the panels into close engagement, and further clockwise rotation of the stud will insure positive locking by generating great radial force on the stud. After the stud threads engage, no matter how far home they may be then screwed, the constant prevailing torque to prevent unintentional retraction of the stud will be provided by pressure from the coil spring which is engaging the jaws to slide them downwardly and inwardly on the frusto-conical tapers and which will thereby generate constant radial force on the stud. Means are provided to lock the pair of jaws against turning with respect to the receptacle and yet permitting them to both move axially and radially. Such means is herein shown as comprising what is herein termed a key ring which is coaxial to the receptacle and interposed between the coil spring and proximate upper end of the sleeve. Diametrically opposite keys formed as integral parts with the said key ring project radially outward into grooves in the receptacle that extend longitudinally of the receptacle, said keys also projecting downwardly between the facing edges of the jaws in the space provided therebetween.

Figure 2:
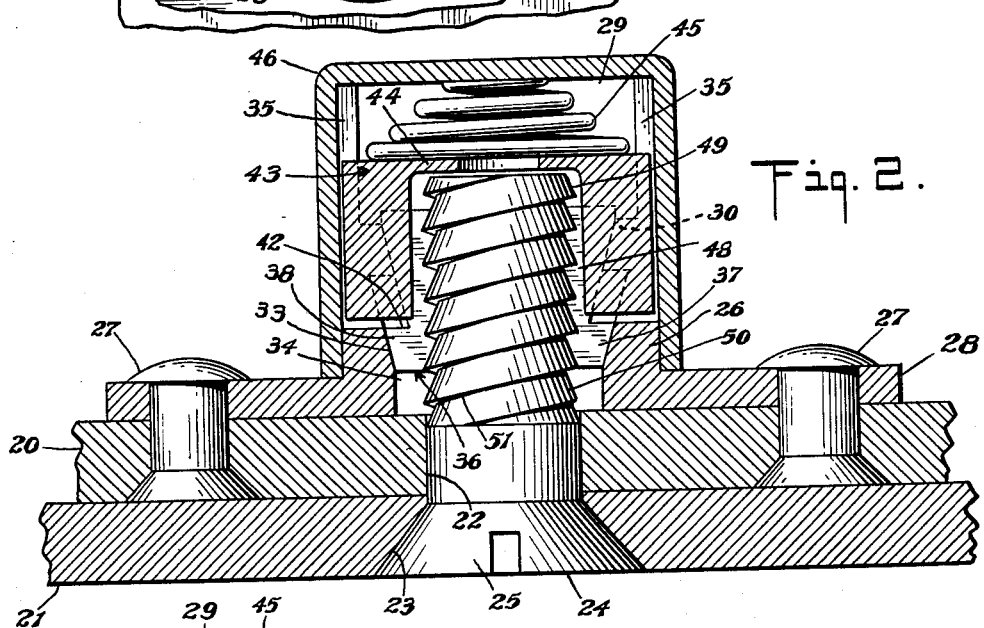
FIGURE 2 is a vertical cross-sectional view taken on line 2—2 of FIG. 1.
Figure 3:
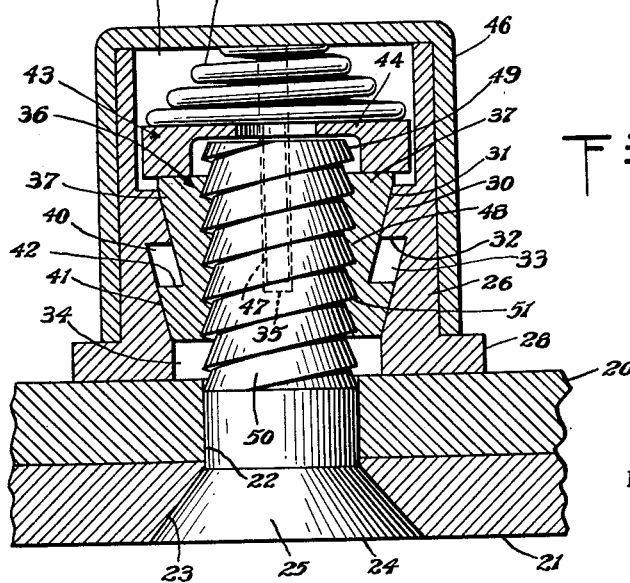
FIGURE 3 is another vertical sectional view taken at right angles to the sectional view of FIG. 2.

Referring now to the specific embodiment of the invention illustrated in said drawings, and giving attention more especially to the showing thereof in FIGS. 1 to 10 inclusive, the reference numerals 20, 21 designate two members, such as panels, adapted to be juxtaposed and clamped together by the fastening device of the present invention. These members are representative of any number and thickness of bodies to be clamped together, and for distinguishing purposes, member 20 will be arbitrarily designated as the inner member, and the other will likewise be arbitrarily designated the outer member 21. Said members have holes 22, 23 therein adapted to register axially, both of said holes being shown to appropriately receive, in the ultimate assembly, a stud 24 more fully described hereinbelow, insertable through both of said holes, the head 25 being shown as tapered and seating in a corresponding taper of hole 23.

The fastening device also includes a receptacle 26 suitably mounted on the inner member 20 to have coaxial relationhsip to the stud in the ultimate assembly and therefore coaxial with hole 22 in the member 20 on which it is mounted. For the sake of simplicity of illustration, said receptacle is shown herein as fixed on the inner member by means of rivets 27 through a flange 28 conveniently provided as an integral part of the receptacle, at what is here termed the bottom of the receptacle, but other suitable mounting of the receptacle may be employed. Said receptacle is hollow and of special formation of inner wall or bore. For a short distance down from the top end of the receptacle, the bore has its maximum diameter and constitutes what may be termed a cylindrical pocket 29. At the bottom of this pocket is an inwardly directed peripheral projection 30 the inner face whereof tapers downwardly inward and is herein referred to as a frusto-conical cutout 31 the larger diameter of which is at the top of the projection and the smaller diameter of which is at the bottom of the projection, the frusto-conical cutout or surface being coaxial with the receptacle. The bottom face 32 of said projection is in a plane perpendicular to the axis and, as will be seen later, constitutes a stop for a subsequently described sleeve. Below said projection said bore is formed with another frusto-conical cutout 33 the slope of which is at the same angle and direction as the upper cutout and the smaller diameters of both cutouts are equal one to the other. Below the lower cutout 33, of the same diameter as the smaller diameter thereof, the bore provides a true cylindrical clearance space 34 which extends to the bottom of said receptacle. The wall of the receptacle 26 has diametrically opposite longitudinal slots 35 extending downwardly from the upper edge thereof well down into the lower cutout 33 for purposes which will appear hereinafter in connection with description of a so-called keyring.

The entire bore of the receptacle, inclusive of said pocket 29, cutouts 31 and 33 and clearance space 34, is of larger diameter than the above-mentioned stud 24 so as to accommodate therein a sleeve 36 for location within the cutouts and around said stud in final assembly. Said sleeve 36 is composed of two companion sections herein referred to as half sleeves or jaws 37 which have a diametric slot-like space therebetween and therefore have spaced apart facing edges 38 longitudinally of the sleeve at diametrically opposite sides of the sleeve. Said sleeve also provides chordal flats 39 perpendicular to the diametrical direction of said slot-like space and facing edges 38. The peripheral surface of the sleeve is shaped to provide upper and lower frusto-conical projections 40, 41 respectively for engagement with and at the same angle of taper as the aforementioned cutouts 31, 33 of the receptacle 26. It will be noted that the large diameters of projections 40, 41 are at distances apart axially of the sleeve agreeable to the distance apart of the small diameters of the receptacle cutouts so there will be equal cooperation of wedging or sliding engagement of both projections of the sleeve with both cutouts of the receptacle simultaneously. A shoulder 42 transverse to the sleeve axis is formed at the top of the sleeve lower projection, and this shoulder is adapted to limit upward releasing movement of the sleeve by engagement with aforementioned bottom face or stop 32 of the projection 30 in the receptacle 26. Since the sleeve comprises jaws that can be moved toward each other by virtue of the slot-like space therebetween and have chordal flats at their sides next to said slots, the radial dimension of each jaw is small enough to admit the jaws, one at a time, in place in the receptacle.

Overlying upper end of sleeve 36 is a key-ring 43 the body portion 44 of which is circular and slightly smaller than the diameter of the receptacle pocket 29 so as to readily move up and down therein. On the top of said key-ring 43 is a spiral cone spring 45 which is maintained under compression by bearing against the under side of a cap 46 secured upon the outside of the receptacle 26 by press-fit or otherwise. The under face of said key-ring body portion 44 bears against the top ends of the jaws 37 tending to depress the same at all times. By virtue of the interengagement of the frusto-conical surfaces or cutouts of the receptacle and projections of the jaws, also tends to move them inwardly. The key-ring is also constructed to prevent rotation of either itself or said jaws with respect to the receptacle, and for this purpose is provided with keys or splines 47 in a common diametric plane, one at each side of the body portion and depending therefrom in addition to projecting radially from the outer periphery of said body portion. These splines ride in aforementioned longitudinal slots 35 in the receptacle wall and also ride in the aforementioned spaces between the facing edges 38 of the jaws.

The interior of sleeve 36 is screw-threaded and the stud 24 is correspondingly threaded primarily so that the stud may be screwed into and out of said sleeve. However, the invention also contemplates a construction by which the stud may be slid inwardly of the sleeve across the threads of the sleeve approximately to its inward position of use without having to rotate the stud, and when it reaches that position it may then be rotated and pulled tight by screw operation. In other words, the jaws 37 are constructed and arranged to function as a ratchet engagement for the initial range of insertion of the stud 24, and function as a threaded nut for the final clamping operation. This accordingly supplies the desired quick-fastening feature of the invention.

It is now appropriate to point out, as shown in FIGURES 6 and 6A, that the threads 48 of each jaw are crescent-shaped the major diameter having a radius A and the minor diameter having a radius B. Preferably said radii A and B are substantially equal to each other and to the radius of the major diameter of the stud thread 49. In referring to the radii as substantially equal, I wish it to be understood that deviation from precise equality is in favor of the radius B of the peaks of the jaws threads being slightly greater than the radius A of the valleys of said threads and greater than the radius of the peaks of the stud threads; whereas any tolerance in radius of the stud threads will be in favor of the same as no greater than the radius of the valleys of the jaw threads. The center for radius B for the peak of the jaw thread is off-set from or eccentric to the center for the radius A for the valley of the jaw thread in appropriate direction and distance for obtaining the resultant crescent shape of said thread. Such off-set is of course on a line perpendicular to plane 38' of facing edges 38 of each jaw and is a distance of off-set which equals the normal maximum depth of the thread plus the aforementioned slight deviation of greater length of radius B from radius A. Thus when the peak of a stud thread is pushed across the peak of a jaw thread there will not be exact concentricity, but instead, the ends of the jaw threads will be out of contact from the stud thread and only the medial portion of the jaw thread peak will engage the peak of the stud thread over which it is passing. The planes 38' of the facing edges 38 of the jaws are chordal to the threaded hollows of the jaws as a consequence of which the peak of each thread is less than a semicircle from one edge 38 to the other. The distance C from the chordal plane of a jaw perpendicular thereto, to the maximum depth of the thread valley of the jaw is therefore less than the radius A of such valley. When the jaws are in position of interengagement of the threads thereof with the threads of the stud, the center of radius A for the arc of the valley of the jaw thread is concentric with the center of the stud and its threads, that center being located midway between the two chordal planes 38' of the jaws. By virtue of the crescent shape of the threads plus the fact that radius B for the peaks is greater than radius A for the valleys of the jaw threads, the thread formation disappears next to facing edges 38 which therefore presents a longitudinal straightline corner eliminating any thread corners thereat that, if present, could dig into the stud threads 49, and the structure as shown will therefore allow the stud to slide inwardly without any difficulty.

The threads 48 of the sleeve and threads 49 of the stud are especially shaped as to angular disposition of the facets thereof to the axis. For indentification purposes, one facet of each thread will be referred to as the insertion facet 50 and has a relatively long inward upward taper toward the axis permitting sliding insertion of the stud into the sleeve, whereas the other facet for convenience designated the retention facet 51 is within a critical stage of 90° to the axis so as to prevent retraction of the stud except by an unscrewing actuation thereof. Otherwise defined, the insertion facets have materially greater length from peak to valley than the retention facets, and the insertion facets have closer approach to parallelism to the axis than to perpendiculars to the axis, whereas the retention facets have short lengths from peak to valley and are perpendicular to or nearly perpendicular to the axis. The arbitrary angularities selected for illustration in the drawings show the insertion facet as having an acute angle of 25° to the axis as a preferred angle within the critical range of 15° to 45° to the axis. Likewise the angularity of the retention facet is shown as the preferred angle of 90° within the critical range of 90° to 120°.

Attention may now also be directed to the angularities of the frusto-conical surface of the exterior of the sleeve and corresponding cutout interior surfaces of the receptacle. There it will be observed that the shoulders of short facets are perpendicular to the axis, and that the frusto-conical or tapered surfaces are at an angle of 10° to 25° to the axis of the stud and sleeve with the tapered surfaces having greater length from peaks to valleys than the shoulders or short facets.

The half sleeves or jaws are factory assembled in the receptacle 26 to jointly constitute sleeve 36, and upon insertion of key-ring 43 with the keys 47 thereof located between the facing edges of said jaws the diameter of the sleeve is then maintained large enough so that the jaws cannot pass through and escape from the receptacle. Spring 45 is then applied and cap 46 pressed into place and securely attached. Presence of spring 45, under compression, forces the jaws toward the lower or open end of the receptacle, and by virtue of the frusto-conical surfaces in the receptacle bore and the corresponding fruso-conical surfaces of the projections on the exterior of the jaws, the downward movement of the sleeve results in the jaws moving radially inwardly toward each other to assume what is herein termed their normal position. With said jaws thus located in normal position, the effective pitch diameter of the internal thread thereof is less than the pitch diameter of the threads on the stud. The stud, however, having threads tapering inwardly toward its end can be readily pushed into the hollow of the sleeve at the same time pushing the sleeve upward enabling the jaws to spread apart and admit the stud threads to slide across the jaw threads seating the stud deeper and deeper into the sleeve until the stud is stopped by engagement of its head against the outer member 21. Then by appropriate use of a tool, such as a screw driver, the stud is turned in the manner of an ordinary screw, the retention facets 51 of the stud and sleeve then cooperating to pull the jaws downward toward the head of the stud. But it will be seen that for the sleeve to move downward it must also reduce in diameter, which it can do by virtue of its construction as two jaws. Such construction of the sleeve generates a radial compressive force of each jaw upon the stud and grips it with great tenacity and at the same time compresses the juxtaposed members 20, 21 tightly together as the stud tries to ride inwardly on the retention facets of the screw threads.

It is important to note that since the retention facets of the interengaging stud and sleeve threads are perpendicular or nearly perpendicular to the axis, outward pull exerted on the stud by the outer member 21 or introduced by vibration or otherwise, cannot apply any detrimentally effective moments of force on that facet adverse to its full applied tension drawing the sleeve downward, and therefore even if, through carelessness or otherwise, the stud has not been screwed fully home, it still will have no tendency to unscrew from its applied position. Furthermore, it is an essential feature of the invention that the spring 45 in applying constant downward pressure on the key-ring 43 and jaws 37 functions through the inward force exerted by the conical surfaces at the inside of the receptacle against the conical surfaces of the outside of the half sleeves or jaws, applies a prevailing torque on the stud threads to keep the stud from turning inadvertently. Thus this prevailing torque also serves to maintain the device together at whatever position to which the stud may have been inserted even though not fully screwed home. Again it is important to note that when the stud has once been screwed home to apply the tenacious gripping of the sleeve jaws thereon, breakage or other release of the spring will not in the least release the said tenacious gripping of the stud by the said jaws and that such release can only be obtained by intentional use of rotative force by a tool to unscrew the stud. In view of the plurality of convolutions of inter-engaging threads of the stud and sleeve, the device will not only be capable of withstanding heavy loads, but will also be capable of accommodating members to be clamped that may vary very widely in thickness.

Giving attention now to the modification shown in FIGURE 11, the foregoing description pertaining to the members being clamped, attachment of the receptacle thereto, key-ring and keys, spring and cap apply equally thereto, and like reference numerals have been used where they apply. In this showing, however, while the interior cutouts in the receptacle 26a are of conical nature, they are formed as spiral convolutions 52 providing tapering surfaces 53 cooperating with similar spiral convolutions 54 with tapering surfaces on the exterior of half sleeves or jaws 55. As before, downward pull by the stud 56 on the jaws will obtain a forceful contraction of the sleeve constituted by said jaws to tenaciously grip the stud. The slope of the tapering surfaces has been indicated in this view as preferably 32½° to the axis, but may be varied if desired. The upper face of each cutout of the receptacle is shown perpendicular to the axis and the top face of the convolutions of the sleeve are correspondingly perpendicular to the axis and constitute stops for limiting upward sliding movement of the jaws. Since the jaws are keyed to the receptacle, there is no rotation of the jaws on the spiral cutouts, they being made spiral for facilitating factory assembly. In this instance, the interior of the jaws and exterior of the stud have ordinary V-threads 57. Screwing the stud home in the sleeve will draw the jaws downwardly and will simultaneously cause them to contract and apply tenacious grip to the stud, and of course clamp the members together to which the device is applied.

I claim:

1. A fastening device of the quick-locking type having a receptacle and threaded stud insertable into said receptacle on a common axis therewith, comprising a pair of jaws in said receptacle, said jaws having internal screw threads for receiving said threaded stud and having four longitudinal edges facing each other in pairs at the arcuate ends of said threads, said jaws and receptacle having cooperating sloping faces for contracting said jaws by sliding said jaws toward the lower ends of said sloping surfaces, a movable key-ring at the upper end of and in engagement with said jaws, said key-ring having a circular body engaging ends of said jaws and having a pair of diametrically opposed keys opposite faces whereof are parallel to each other and parallel to a medial diametric plane of the keys and circular body, said keys being located between and opposed to respective said longitudinal edges of the pairs of facing edges of the jaws, said longitudinal facing edges of the jaws having planar portions parallel to and movable into contact with respective parallel faces of said keys, and said keys providing a fixed engagement for all four of the said longitudinal facing edges of the jaws and in conjunction with said engagement of the ring body with the ends of said jaws maintaining said planar portions of the jaws parallel to each other and maintaining the lead angle at all of the thread ends aligned for proper engagement with the stud threads.

2. A fastening device of the quick-locking type having a receptacle and threaded stud insertable into said receptacle on a common axis therewith, comprising a pair of jaws in said receptacle, said jaws having internal screw threads for receiving said threaded stud and having four longitudinal edges facing each other in pairs at the arcuate ends of said threads, said jaws and receptacle having cooperating sloping faces for contracting said jaws by sliding said jaws toward the lower ends of said sloping surfaces, a movable key-ring overlying the upper ends of and in engagement with said jaws for effecting predetermined relation of said jaws to each other, said key-ring having a circular body engaging ends of said jaws and having a pair of diametrically opposed keys opposite faces whereof are parallel to each other and parallel to a medial diametric plane of the keys and circular body, said keys being located between and opposed to respective said longitudinal edges of the pairs of facing edges of the jaws, a spring pressing against said ring body at the opposite face thereof from said keys, thereby enforcing engagement of the ring body with said jaws and enforcing maximum insertion of said keys between the respective pairs of said jaw faces, said longitudinal facing edges of the jaws having planar portions parallel to and movable into contact with respective faces of said keys, and said keys providing a fixed engagement for all four of said longitudinal facing edges of the jaws and in conjunction with said engagement of the ring body with the ends of said jaws maintaining said planar portions of the jaws parallel to each other and maintaining the lead angle at all of the thread ends aligned for proper engagement with the stud threads.

References Cited by the Examiner

UNITED STATES PATENTS

| | | | |
|---|---|---|---|
| 298,704 | 5/84 | Norris | 74—424.8 |
| 1,879,421 | 9/32 | Nalle | 16—19 |
| 2,048,298 | 7/36 | Searles | 151—19 |
| 2,874,877 | 2/59 | Spencer | 85—33 |

FOREIGN PATENTS 517,703   3/55   Italy.

EDWARD C. ALLEN, *Primary Examiner*.

CARL W. TOMLIN, M. HENSON WOOD, JR.
*Examiners.*